No. 710,325. Patented Sept. 30, 1902.
M. KERN & A. WIGET.
APPARATUS FOR TRANSPORTING LIVE AQUATIC ANIMALS.
(Application filed Feb. 6, 1901.)
(No Model.)

Witnesses: Inventors:

UNITED STATES PATENT OFFICE.

MAX KERN, OF ST. GALL, AND ALFRED WIGET, OF ZURICH, SWITZERLAND.

APPARATUS FOR TRANSPORTING LIVE AQUATIC ANIMALS.

SPECIFICATION forming part of Letters Patent No. 710,325, dated September 30, 1902.

Application filed February 6, 1901. Serial No. 46,246. (No model.)

*To all whom it may concern:*

Be it known that we, MAX KERN, residing at St. Gall, and ALFRED WIGET, residing formerly at St. Gall, but now at Zurich, Switzerland, citizens of the Republic of Switzerland, have invented new and useful Improvements in Apparatus for Transporting Live Aquatic Animals, of which the following is a specification.

As is well known, the transport of live fish, oysters, and the like is attended by the greatest difficulty, as the water very quickly loses its contained air, together with the oxygen necessary to the life of the fish. For this reason the fish-tanks hitherto employed require to be constantly supplied with fresh water or to have the whole of the water renewed at short intervals of time.

Now a water-tank according to this invention is provided with means for supplying the necessary oxygen to the water by passing into the tank either air or the constituent thereof—*i. e.*, oxygen—necessary for the breathing of the denizens of the water. An example of such a tank is shown in the accompanying drawings.

Figure 1:
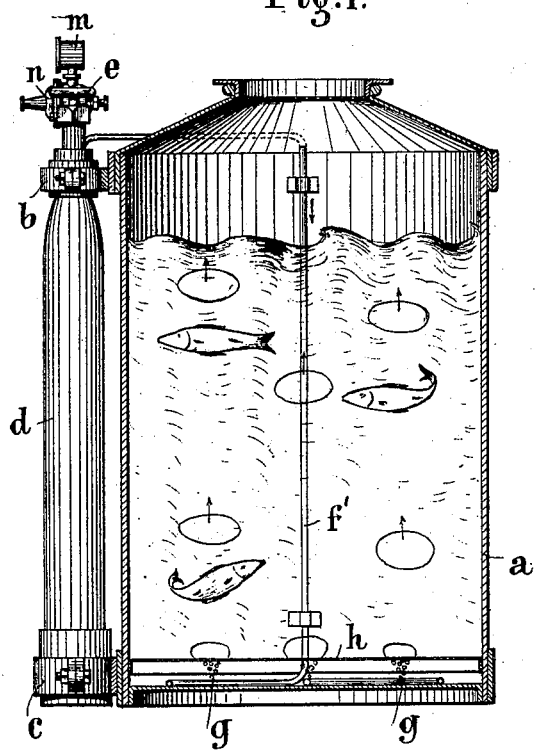
Figure 2:
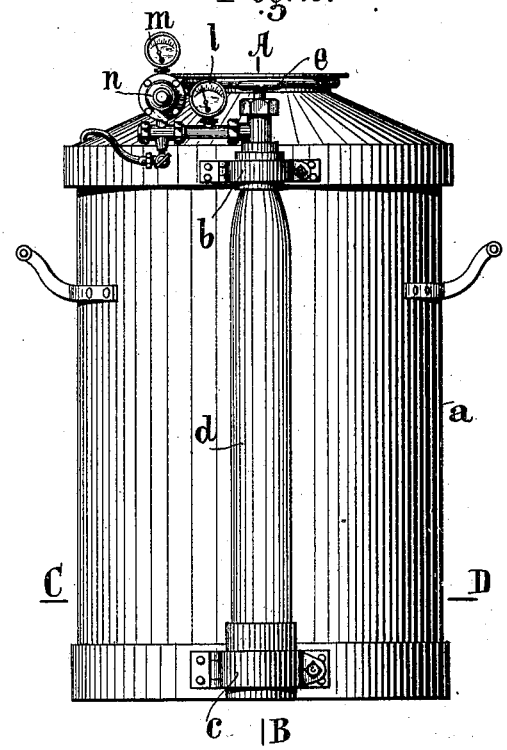
Figure 3:
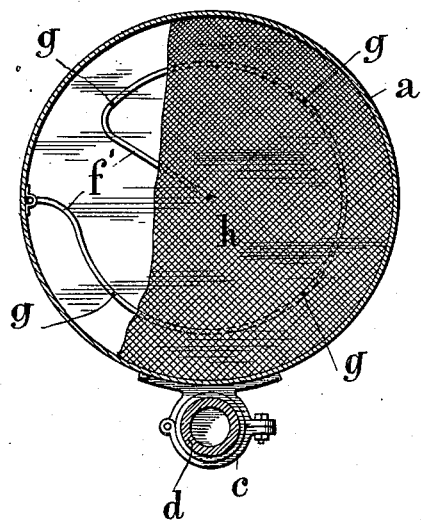

Figure 1 is a vertical section of the apparatus; Fig. 2, an elevation, and Fig. 3 a horizontal section corresponding to the line C D of Fig. 2.

Attached to the transport vessel or tank $a$ for receiving the water and the animals, which to facilitate removal may be mounted upon rollers, are two straps $b$ and $c$ for the purpose of securing a pressure-bottle $d$, which may contain compressed air or oxygen. An exhaust-valve provided at the upper end of the pressure-bottle can be opened or closed by means of a hand-wheel $e$, and a pressure-reducing valve $n$ is mounted on a short pipe $f$, coupled to valve-seat of the valve in the pressure-bottle. The pressure in the pressure-bottle and the reduced pressure can both be measured by the pressure-gages $l$ and $m$. The pipe on which is mounted the reducing-valve is connected with a pipe $f'$, which is attached to the tank $a$ and extends to the bottom thereof, where it is bent to the form of a curve. The curved portion is provided with a number of fine openings $g$, which allow the oxygen or the air supplied through the reducing-valve at reduced pressure to escape slowly or in successive small quantities.

In order that the air or oxygen as it rises may agitate the water and be distributed or diffused therein, there is arranged within the tank $a$, above the ports or openings $g$ of the pipe $f'$ on its floor, a sieve $h$, to the under side of which adhere bubbles which can unite to form larger bubbles, which then rise in the water and, setting it in motion and becoming distributed, diffused, or subdivided, communicate thereto the necessary oxygen needed for the prolonged retention of the animals in the tank. For the transport of oysters the tank may be provided with a number of removable sieves arranged at suitable distance one above another.

Having now particularly described and ascertained the nature of our said invention and in what manner the same is to be performed, we declare that what we claim is—

The combination with a receptacle for the transportation and storage of live fish and the like, of a pressure-bottle removably mounted thereon, an exhaust-valve in the top of said bottle, means for operating said valve, a pipe connected to the pressure-bottle, a gage for measuring the pressure therein, a pressure-reducing valve mounted on said pipe, a gage for measuring the pressure of the reducing-valve, an air-pipe detachably connected to the aforesaid pipe extending into the receptacle and terminating in a perforated coil near the bottom thereof, and a foraminous plate mounted above said coil in close proximity thereto, substantially as and for the purpose specified.

In testimony whereof we have signed our names to this specification in the presence of two subscribing witnesses.

MAX KERN.
ALFRED WIGET.

Witnesses:
JOSEPH SIMON,
RUDOLF BECKER.